Oct. 3, 1961 J. KOSTELEC 3,002,835
PHOTOCONDUCTIVE RECORDING ELEMENT
Filed July 30, 1958
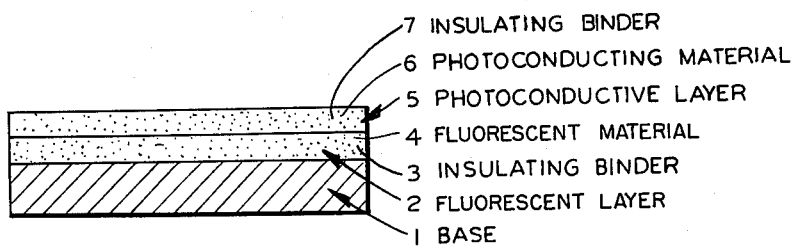
7 INSULATING BINDER
6 PHOTOCONDUCTING MATERIAL
5 PHOTOCONDUCTIVE LAYER
4 FLUORESCENT MATERIAL
3 INSULATING BINDER
2 FLUORESCENT LAYER
1 BASE
INVENTOR
JOZE KOSTELEC
ATTORNEYS 3,002,835
PHOTOCONDUCTIVE RECORDING ELEMENT
Joze Kostelec, Binghamton, N.Y., assignor to General Aniline & Film Corporation, New York, N.Y., a corporation of Delaware
Filed July 30, 1958, Ser. No. 751,968
6 Claims. (Cl. 96—1)

This invention relates to electrophotography and more particularly to a new and improved electrostatic recording element for the production of electrophotographic images.

It is known to produce images or visible records by means of electrostatic printing methods. In general, electrophotographic images can be produced by placing an electrostatic charge in the dark upon a surface of a recording element comprising a base having thereon a coating of the photoconductive material dispersed in an insulating binder. When such a recording element is exposed to radiation emanating from an optical image, the electrostatic charge on the recording element is neutralized in proportion to the intensity of the incident radiation. As a result, the optical image is converted into an electrostatic charge pattern or a latent image composed of electrostatic charges of varying intensity. The aforesaid latent image thus formed on the recording element may then be rendered visible by development employing processes well-known in the art.

Electrostic recording elements can be produced which are responsive to a wide band of the electromagnetic spectrum such as visible light, ultraviolet light, X-rays, gamma rays, and the like. The production of electrophotographic images, wherein X-rays are used as a source of radiation, is known as electroradiography and has found extensive use and application in the medical and kindred fields.

Among the many different photoconductive materials which have been suggested for use in electrophotographic recording elements, the following are typical: zinc oxide, sulfur, anthracene, anthraquinone, lead iodide, cadmium sulfide, cadmium selenide, and others. The insulating binder or matrix for the photoconductive material commonly employed are mainly the organic film-forming materials such as the natural and artificial resins and waxes. Examples of such materials which have been suggested for use as binders, are the silicone resins, cellulose esters, i.e., cellulose acetate, cellulose acetate butyrate, cellulose nitrate, etc., cellulose ethers i.e. ethyl cellulose, methyl cellulose, etc., vinyl resins, i.e., polyvinyl acetate, polystyrene, etc. waxes, paraffin wax, carnauba wax and natural resins such as shellac.

In some instances, it may be desirable to incorporate sensitizing dyes in electrostatic recording elements in order to alter the spectral response of a particular photoconductive material. Thus, a sensitizing dye may be selected for the purpose of increasing the speed of the spectral response of a photoconductive material by extending or increasing the characteristic or inherent absorption of the photoconducting material, itself. Or, a dye may be selected for the purpose of sensitizing the photoconducting material to a different portion of the spectrum and thus extend the band of frequencies to which the photoconducting material will respond. Among the dyes which have been suggested as sensitizers for use in electrophotography are the phthalein type dyes such as rose bengal, the triphenylmethane dyes such as melachite green and methyl green, the cyanine dyes such as kryptocyanine, acridine orange, as well as many others.

A photoconductive recording element produced in accordance with the teachings of the prior art comprises a base such as paper, having coated thereon a photoconductive layer comprising finely divided white zinc oxide as the photoconductor dispersed in a silicone resin. If desired, a sensitizing dye such as rose bengal may also be incorporated in order to increase the sensitivity or spectral range of the photoconductive layer.

Although photoconductive recording elements, produced as described above, are satisfactory for certain applications, the fact that such recording elements lack sufficient speed in their response to radiation has precluded or greatly restricted electrophotographic printing and recording.

It is, therefore, evident that a need exists in the art for photoconductive recording elements characterized by greater sensitivity or speed of response to radiation and provision of such improved photoconductive recording elements and a method for producing them constitutes the objects and purposes of this invention.

According to the present invention, an improved photoconductive recording element can be produced by using certain fluorescent substances in combination with a photoconductor whereby the spectral emission of fluorescent material coincides with the absorption peak of the said photoconducting layer, thus insuring maximum efficiency of the system. In general, the invention includes a fluorescent layer interposed between a backing or base on the one side and a photoconductive layer on the other side.

The invention will now be described in greater detail with reference to the accompanying drawing, the single figure of which shows a schematic sectional view of a photoconducting recording unit produced in accordance with the present invention. 1 is a base or backing which is a relatively non-conducting material such as paper or is a relatively conductive material such as aluminum or other similar metallic material. 2 represents a fluorescent layer comprising an insulating binder or matrix 3, having dispersed therein a fluorescent material 4. 5 is a photoconductive layer wherein the photoconducting material 6 is dispersed or distributed throughout an insulating binder 7. A sensitizing dye may or may not be incorporated in the photoconductive layer.

In making the photoconducting recording member of my invention, a suitable fluorescent material is dispersed in a binder and the resulting mixture coated on a base and allowed to dry. The fluorescent layer is then coated with a layer of photoconductive material or dye sensitized photoconductive material dispersed in a binder of the same type used in preparing the above described fluorescent layer. As previously mentioned, a fluorescent material is selected having a spectral emission band situated within the absorption band of the photoconductive material itself or within the absorption band of the dye sensitized photoconductive material. A synergistic effect is thus obtained in which the fluorescent material reinforces or amplifies the response to radiation of the resulting composite photoconductive recording element with a consequent increase in sensitivity over and beyond that of the photorecording elements of the prior art not employing the fluorescent layer feature.

Reference is now made to the following example which describes the invention in greater detail. It is to be understood, however, that such an example is given as illustratory only and it not to be taken as imposing any restriction or limitation on the invention.

*Example I*

Copper activated zinc sulfide powder was dispersed in a solution of silicone resin. The preferred ratio of powder to resin is 4 to 1, by weight, although any other convenient ratio may be chosen. A paper base was coated with the above dispersion and dried. The thickness of the coating was about 0.0005 inch. Another dispersion was made by mixing white zinc oxide powder in a solution composed of the aforesaid silicone resin in addition to a small amount of approximately 0.03% based on the zinc oxide of rose bengal dye. The ratio of zinc oxide to resin was 4 to 1, by weight, although any other convenient ratio may be used. The resulting zinc oxide dispersion was then coated over the previously described zinc sulfide layer. The thickness of the second coating containing zinc oxide was approximately 0.0003 inch. The resulting photoconductive recording member, having an intermediate fluorescent layer when sensitized by a corona discharge in the usual manner, possesses higher sensitivity to radiation and similar recording elements which do not incorporate the intermediate fluorescent layer, as the following comparison will show.

In the following table is shown the half life time, in seconds, of the decay of the electrostatic surface charges of recording elements prepared in accordance with my invention using different fluorescent materials. In the same table is also shown the half life, in seconds, of recording elements of the prior art which do not embody the fluorescent layer feature of the present invention.

| | Reciprocals of half life time |
|---|---|
| (1) Commercially available recording element ("Electrofax" paper) | 3.2 |
| (2) ZnS(Cu)(2210)+ZnO with rose bengal | 5.0 |
| (3) ZnS(Cu)(1953)+ZnO with rose bengal | 5.5 |
| (4) ZnS(Cu,Co)+ZnO with rose bengal | 11.0 |

As is readily evident from the table, the half life times of the photorecording elements described in the present invention are lower than the commercial photographic elements, thus revealing the increased radiation sensitivity of the recording elements containing intermediate fluorescent layers.

The electrostatic charge in the recording elements make and described herein will persist in the dark for periods of time ranging from 10 to 30 minutes which allows ample time to expose and process the sensitized recording elements without the loss of and appreciable amount of surface charge.

Additional examples may be readily prepared as described above using the various photoconductors, fluorescent materials and base materials listed elsewhere in the specification.

The silicone resin used in the example is available as "GE Silicone Resin SR-82," marketed by the General Electric Company, Pittsfield, Massachusetts.

The white zinc oxide is known as "French Process Florence Green Seal Pigment Grade" marketed by the New Jersey Zinc Sales Company, Inc., New York, New York.

The rose bengal dye is known as "Rose Bengal C.I. No. 779" and is manufactured by the National Aniline Division, Allied Chemical & Dye Corporation, New York, New York.

The numbers (2210) and (1953) in items (2) and (3) respectively, of the example, refer to the batch numbers of the ZnS(Cu) of the manufacturer.

I claim:
1. An electrophotographic recording element having increased efficiency comprising an electrically conducting base; an intermediate fluorescent layer comprising copper activated zinc sulfide uniformly dispersed throughout an electrically insulating binder and an outer photoconductive layer comprising zinc oxide dispersed in an electrically insulating binder, whereby the copper activated zinc sulfide on excitation by the exposed radiation emits a secondary radiation, the wave length of which corresponds to the wave length of the light absorption of the zinc oxide.
2. A recording element as described in claim 1, wherein the zinc oxide is dye sensitized.
3. A recording element as described in claim 2, wherein the dye is selected from the class consisting of rose bengal, melachite green, methyl green, kryptocyanine and acridine orange.
4. A recording element as described in claim 3, wherein the dye is rose bengal.
5. A recording element as described in claim 1, wherein the insulating binder is selected from the class consisting of silicone resins, cellulose esters, cellulose ethers, vinyl resins, waxes and natural resins.
6. A recording element as described in claim 5, wherein the insulating binder is a silicone resin.

References Cited in the file of this patent
UNITED STATES PATENTS

| | | |
|---|---|---|
| 2,409,162 | Staud | Oct. 8, 1946 |
| 2,554,017 | Dalton | May 22, 1951 |
| 2,663,636 | Middleton | Dec. 22, 1953 |
| 2,664,044 | Dalton | Dec. 29, 1953 |
| 2,673,153 | Talbot | Mar. 23, 1954 |
| 2,692,178 | Grandadam | Oct. 19, 1954 |
| 2,716,081 | Marks | Aug. 23, 1955 |
| 2,739,243 | Sheldon | Mar. 20, 1956 |
| 2,798,960 | Moncrieff-Yeates | July 9, 1957 |
| 2,844,543 | Fotland | July 22, 1958 |
| 2,844,734 | Hartmann | July 22, 1958 |
| 2,862,815 | Sugarman et al. | Dec. 2, 1958 |
| 2,901,348 | Dessauer et al. | Aug. 25, 1959 |

FOREIGN PATENTS

| | | |
|---|---|---|
| 201,416 | Australia | Apr. 13, 1956 |
| 157,101 | Australia | June 16, 1954 |
| 201,416 | Australia | Apr. 13, 1956 |

OTHER REFERENCES

Mees: The Theory of The Photographic Process, revised ed., Macmillan (1954), pp. 131–134.